(12) United States Patent
Visagathilagar et al.

(10) Patent No.: US 8,358,882 B2
(45) Date of Patent: Jan. 22, 2013

(54) MODALMETRIC FIBRE SENSOR

(75) Inventors: Yuvaraja Visagathilagar, Wartirna South (AU); Bernhard Koziol, Lower Plenty (AU); Jim Katsifolis, Northcote (AU)

(73) Assignee: Future Fibre Technologies Pty Ltd., Victoria (AU)

( * ) Notice: Subject to any disclaimer, the term of this patent is extended or adjusted under 35 U.S.C. 154(b) by 135 days.

(21) Appl. No.: 12/921,796

(22) PCT Filed: Mar. 10, 2009

(86) PCT No.: PCT/AU2009/000279
§ 371 (c)(1), (2), (4) Date: Dec. 13, 2010

(87) PCT Pub. No.: WO2009/111820
PCT Pub. Date: Sep. 17, 2009

(65) Prior Publication Data
US 2011/0097032 A1    Apr. 28, 2011

(30) Foreign Application Priority Data
Mar. 11, 2008    (AU) .............................. 2008901146

(51) Int. Cl.
*G02B 6/00*    (2006.01)
*G01J 4/00*    (2006.01)

(52) U.S. Cl. .............. 385/12; 385/38; 385/140; 385/26; 385/27; 385/53; 250/227.11; 250/227.18

(58) Field of Classification Search ..................... 385/12, 385/13, 31, 38, 140, 53; 250/227.11, 227.12, 250/227.14, 227.18
See application file for complete search history.

(56) References Cited

U.S. PATENT DOCUMENTS

| | | | |
|---|---|---|---|
| 4,843,233 A | | 6/1989 | Jeunhomme |
| 4,854,706 A | * | 8/1989 | Claus et al. .................... 356/477 |
| 5,144,689 A | | 9/1992 | Lovely |
| 5,892,866 A | * | 4/1999 | Bristow et al. .................. 385/28 |
| 6,965,713 B2 | | 11/2005 | Sidorovich |
| 7,196,317 B1 | * | 3/2007 | Meissner et al. .......... 250/227.14 |
| 2003/0002769 A1 | * | 1/2003 | Lovely et al. .................... 385/12 |
| 2005/0047728 A1 | * | 3/2005 | Tobiason et al. ................ 385/89 |
| 2011/0097032 A1 | * | 4/2011 | Visagathilagar et al. ....... 385/12 |

OTHER PUBLICATIONS

PCT/AU2009/000279 International Search Report.

* cited by examiner

*Primary Examiner* — Brian Healy
(74) *Attorney, Agent, or Firm* — Michael Best & Friedrich LLP (57) ABSTRACT

A modalmetric fibre sensor comprises a multimode sensor fibre (26), a light source (14) for launching light into the multimode fibre (26) to produce a multimode speckle pattern of light at an end of the fibre (26), a single mode fibre (22) to receive light from the multimode speckle pattern and a detector (18) connected to the single mode fibre (22) to detect the received light from the multimode speckle pattern. A connector (33) connects the ends of the multimode fibre (26) and single mode fibre (22) with the end faces (31,32) of the two fibres disposed at an acute single to one another. The light from source (14) may be transmitted to the multimode fibre (26) through the single mode fibre (22) and the end of multimode fibre (26) remote from single mode fibre (22) may be mirrored to reflect light back along the multimode fibre to the single mode fibre which transmits the received light to the detector (18).

14 Claims, 7 Drawing Sheets

MODALMETRIC FIBRE SENSOR

FIELD OF THE INVENTION

This invention relates to a modalmetric fibre sensor for use in a wide range of physical sensors such as acoustic or vibration sensors, patient monitoring sensors, intrusion detection systems and the like.

BACKGROUND OF THE INVENTION

A modalmetric fibre sensor, or modal domain sensor, is based on measuring a change in the speckle pattern output of a multimode (MM) fibre. When coherent light is injected into a standard MM fibre, a large number of modes are excited which will propagate down the fibre. At the output of the fibre, the interference of the modes produces a pattern known as a speckle pattern. Any disturbance to the fibre which can cause a change in any one of the phase, polarisation and distribution of the modes, will cause the speckle pattern to change. By measuring this change, a physical perturbation to the fibre such as a vibration or strain can be detected. The modalmetric sensor is therefore a multi-beam interferometer encapsulated within one fibre, where each beam can be represented by one of the propagating modes.

The detection of a perturbation using the modalmetric effect usually involves detecting a change in the speckle pattern by sampling or interrogating only part of the overall speckle pattern. This can be done through the use of a physical restricting means where only part of the speckle pattern is detected, or through the use of a CCD detector to electronically sample the required area or speckle pattern sub-zone. This is because a negligible change in intensity of power is detected if the whole speckle pattern is being analysed during a perturbation to the MM fibre.

PRIOR ART

A number of modalmetric sensor configurations have been described in the literature. Most of these are transmissive configurations where light is injected into the sensing multimode fibre and the speckle pattern at the output of the multimode fibre is interrogated. Other configurations are single-ended where light is injected into a MM fibre via a single mode (SM) fibre, reflected off a mirrored end at the second end of the MM fibre, and the speckle pattern interrogated at the first end of the MM fibre. The interrogation means can vary and includes one of using a single mode fibre to view at least part of the speckle pattern, using a traditional spatial filter, or the use of a CCD camera to process only part of the speckle pattern. Such sensors usually have a laser light source, a coupler for coupling the light from the laser light source into a lead in single mode fibre which is fusion spliced to a sensing multimode fibre.

In one reflective arrangement the multimode fibre may have a mirrored end for reflecting light back to the coupler and then to a signal processing section to detect a change in the speckle pattern. When light is injected from the laser source through the coupler and a single mode fibre into the MM fibre, it will essentially excite many core-guided modes as well as some cladding-guided modes. It is assumed that any cladding-guided modes will be quickly attenuated over tens of meters. Light will be reflected from the remote mirrored end-face of the MM fibre and then return back to the input of the MM fibre where there will be a speckle pattern which is formed by the interference of all the modes present at this point in the fibre.

In the reflective arrangement the same single mode fibre which injected the light into the MM fibre can also act as a receiver of the returning light. Due to its relatively smaller core size with respect to the multimode fibre, it will also act as a spatial filter as the SM fibre will effectively only see the very central part of the speckle-pattern. The power from this central part of the speckle pattern will then be received by the detector via the coupler.

Any change in or redistribution of the speckle pattern will be detected as a change in intensity. Since the SM fibre supports only a single mode, it can also act as the insensitive lead-in of the sensing system. The coupler, being a bidirectional device, allows the simultaneous transmission and reception of light to and from the sensor fibre respectively.

Spatial filtering is preferred as the total power in the overall speckle pattern shows no or negligible change when the MM fibre is perturbed by a vibration. By only monitoring part of the overall speckle pattern, a change in the position of the speckles will be easily detected as a change in intensity at the detector. This signal can then be processed to determine and measure the presence of the perturbation. Using this approach, a MM fibre can be used as a sensor in an intrusion detection system.

A number of spatial filtering, or restriction techniques have been previously reported for modalmetric sensors, such as the use of a custom made spacer means between the SM and MM fibre by Lovely (U.S. Pat. No. 5,144,689), the use of CCD detector by Spillman (U.S. Pat. No. 7,189,958), the use of a SM to MM fusion splice by Tapanes (Australian patent No. 688113), and the use of a more basic free space spatial filter by Fuhr et al. The present invention enables spatial filtering to be achieved through a fibre to fibre connection providing improved sensitivity.

SUMMARY OF THE INVENTION

The invention may provide a modalmetric fibre sensor, comprising:
  a multimode sensor fibre;
  a light source for launching light into the multimode fibre to produce a multimode speckle pattern of light at an end of said multimode sensor fibre;
  a single mode fibre having an end connected to said end of the multimode sensor fibre to receive light from the multimode speckle pattern; and
  a detector connected to the single mode fibre to detect the received light from the multimode speckle pattern;
  wherein the end faces of said ends of the multimode fibre and the single mode fibre are disposed at an acute angle to one another.

The end face of the multimode fibre may be normal to the multimode fibre axis and the end face of the single mode fibre may be angled away from the normal to the axis of the single mode fibre through said acute angle.

Alternatively, the end face of the single mode fibre may be normal to the single mode fibre axis and the end face of the multimode fibre may be angled away from the normal to the multimode fibre axis through said acute angle.

In another alternative, both the multimode fibre end face and the single mode fibre end face may be angled away from being normal to the respective fibre axes.

Said acute angle may be in the range 5 to 10°. More particularly, it may fall in the range 6° to 9°.

In a reflective arrangement, the light source may be connected to said single mode fibre so as to launch light through the single mode fibre into said end of the multimode fibre and the other end of the multimode fibre may be mirrored for reflecting light back through the multimode fibre to produce the speckle pattern at the first said end of the multimode fibre. In this arrangement the light source and the detector may be connected to the single mode fibre by a coupler.

In a transmissive arrangement the light source may launch light into an end of the multimode fibre remote from the first-said end of that fibre for transmission through the multimode fibre and the single mode fibre to the detector. In this arrangement, the light source may be connected to the remote end of the multimode fibre via a second single mode fibre through which to launch light into the remote end of the multimode fibre.

BRIEF DESCRIPTION OF THE DRAWINGS

In order that the invention may be more fully explained, some specific embodiments will be described with reference to the accompanying drawings, in which.

DETAILED DESCRIPTION OF THE
EMBODIMENTS OF THE INVENTION

Figure 1:
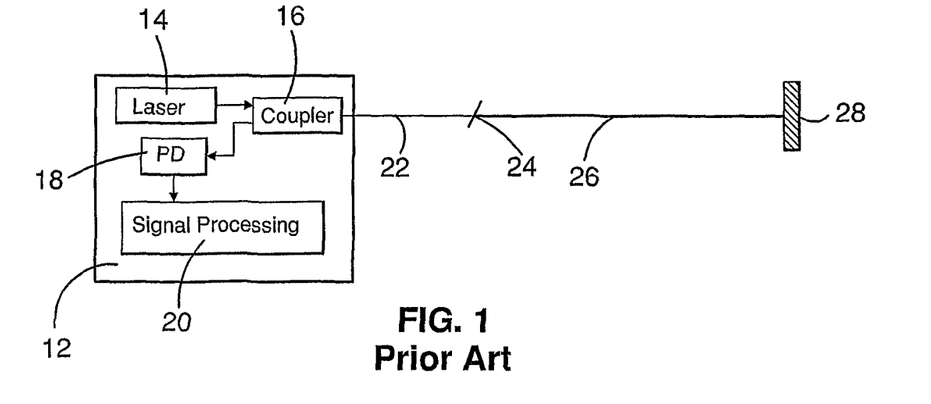
FIG. 1 is a diagram of a conventional reflective modalmetric sensor.

With reference to FIG. 1 which shows a prior art arrangement, a control section 12 has a laser light source 14, a coupler 16, a photo detector 18 and a signal processor 20.

Light from the laser source 14 is provided to the coupler 16 and launched into a single mode fibre 22. The single mode fibre is fusion spliced at 24 to a multimode fibre 26 which has a mirrored end 28. Light travels from the single mode fibre 22, which acts as a both a lead in and lead out fibre, to the multimode sensing fibre 26 which has a distal mirrored end 28. Light travelling down the multimode fibre reflects off the mirrored end and travels back towards the singe mode fibre 22. Any vibration or perturbation of the multimode fibre 26 causes a change in the speckle pattern of the light present at the launch end of the multimode fibre. That light travels back to the coupler and into the detector 18. The detector 18 outputs a signal indicative of a change in the speckle pattern created by the interfering modes in the multimode fibre 26, to the signal processor 20 for analysis.

In the configuration of FIG. 1 the multimode fibre 26 and single mode fibre 22 are fusion spliced at 24 so as to be concentrically aligned. Since the single mode fibre 22 has a much smaller core size than the multimode fibre 26, it acts as a spatial filter so that the power reaching the detector will be from the very central part of the speckle pattern. This part of the speckle pattern shows a smaller amount of spatial change or redistribution in response to an external perturbation to the multimode sensing fibre than outer parts of the pattern. This can be related to the fact that this part of the speckle pattern is dominated by lower order modes guided in the multimode fibre which in turn can limit maximum sensitivity.

Figure 2:
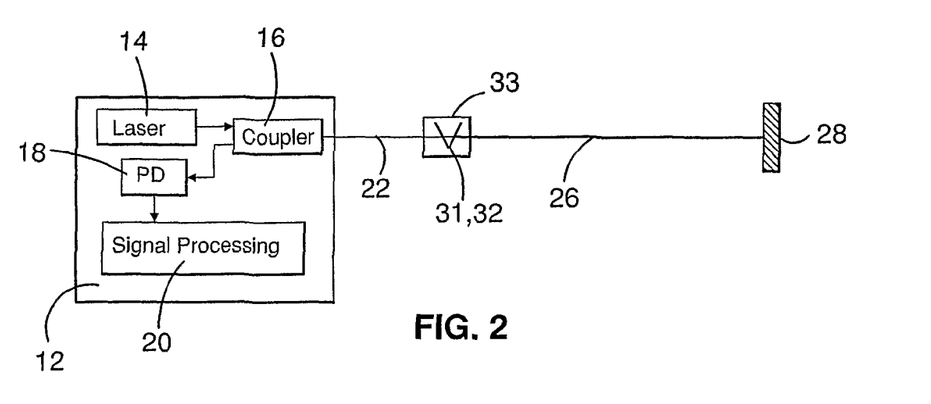
FIG. 2 is diagram of a reflective modalmetric sensor of the present invention.

FIG. 2 illustrates a single ended (reflective) modalmetric sensor made in accordance with the present invention. This sensor is similar in layout to the prior art sensor of FIG. 1 and it comprises many of the same components which are identified by like reference numerals. The essential difference is that the single mode fibre 22 and the multimode fibre 26 have end faces 31,32 disposed at an acute angle to one another and held within a fibre connector 33. The manner in which the fibre end faces 31,32 are angled relative to one another enables the sensitivity of the modalmetric fibre sensor to be enhanced due to effects to be described below.

Figure 3:
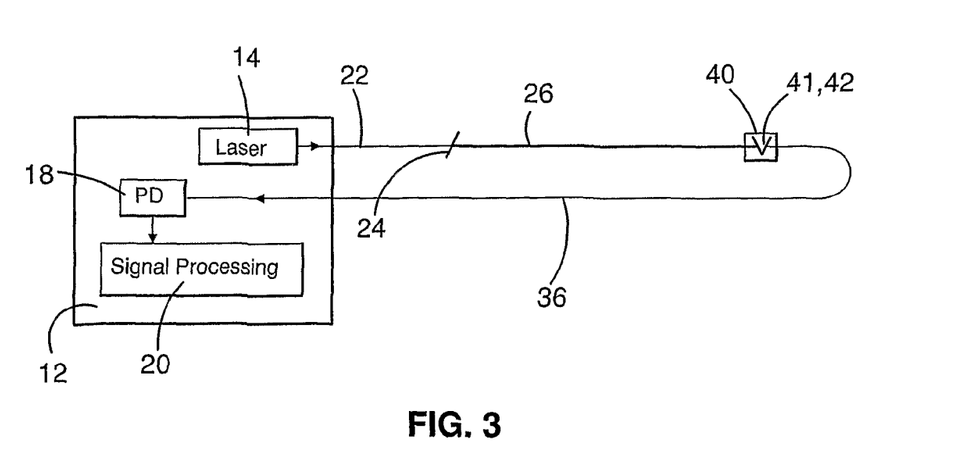
FIG. 3 is a diagram of a transmissive modalmetric sensor of the present invention.

FIG. 3 illustrates a transmissive modalmetric sensor constructed in accordance with the present invention. This transmissive sensor also employs components which are the same as those of the prior art reflective modalmetric sensor of FIG. 1 and like components have been identified by like reference numerals. Essentially the difference in the transmissive arrangement is that the end of multimode fibre 26 remote from single mode fibre 22 is not mirrored but is connected through a connection 40 to a second single mode fibre 36 through which light from the speckle pattern is directed to the detector 18. In accordance with the present invention, the end faces 41,42 of the multimode fibre 26 and single mode fibre 36 within the connection 40 are disposed at an acute angle to one another in the manner discussed below.

Figure 4:
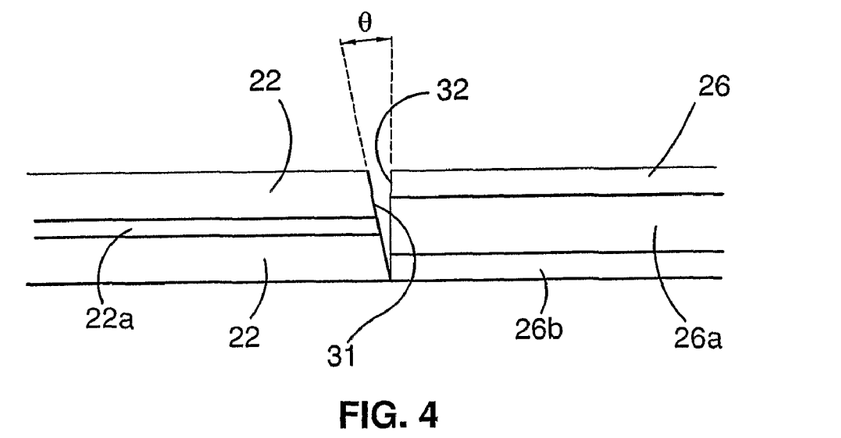
FIG. 4 illustrates one form of connection between fibres in a reflective modalmetric sensor and FIG. 4a shows transmission of the multimode speckle pattern in that connection.
Figure 4A:
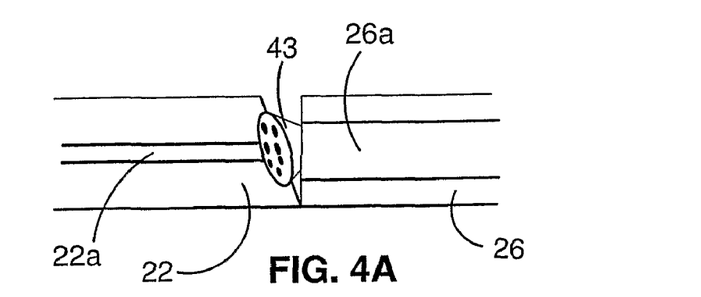

FIGS. 4 and 4A illustrate diagrammatically one manner in which end faces of a single mode fibre and a multimode fibre can be arranged at an acute angle to one another and how this will influence reception of light into the single mode fibre from the speckled pattern at the end of the multimode fibre. The single mode fibre and multimode fibre may be the fibres 22,26 of the reflective modalmetric sensor shown in FIG. 2 and the fibres have been identified accordingly with the respective end faces 31,32.

As is apparent from FIG. 4 the core 22a of the single mode fibre is of much less diameter than the core 26a of the multimode fibre 26 and it will accordingly receive light from a central part of the speckle pattern at the multimode fibre end face 32, thus providing spatial filtering. In the arrangement illustrated in FIGS. 4 and 4A the end face 32 of multimode fibre 26 is normal to the multimode fibre axis and the end face 31 of the single mode fibre is angled away from the normal to the axis of the single mode fibre through an acute angle θ so that the two fibre end faces 31,32 are disposed at the acute angle θ to one another. As discussed below, the angle θ may be in the range 5° to 10° and typically of the order of 7-8°.

Since light projected from end face 32 of multimode fibre 26 will diverge into air as indicated by the cone 43 in FIG. 4A, the angled end of fibre 22 will receive an asymmetrically diverged or stretched central region of the overall speckle pattern which will exaggerate any movement of redistribution of speckles in the "stretched" region. This occurs since the upper part of the speckle pattern as seen in the drawing has essentially diverged further than the lower part before it enters the angled end of single mode fibre 22 with the result that the upper speckles will be relatively larger than the lower ones. This will cause an enhanced change in power as seen by the detector and therefore an increase in the sensitivity of the modalmetric fibre sensor.

Although the arrangement illustrated in FIGS. 4 and 4A has been described as applied to the reflective modalmetric sensor as illustrated in FIG. 2, the same arrangement may be incorporated into the connection 40 between the multimode fibre 26 and the single mode fibre 36 in the transmissive modalmetric sensor illustrated in FIG. 3. In that case, the end face of the multimode fibre may be the end face 41 remote from the single mode fibre 22 and the angled end face of the single mode fibre would be the respective end face of fibre 36.

Figure 5:
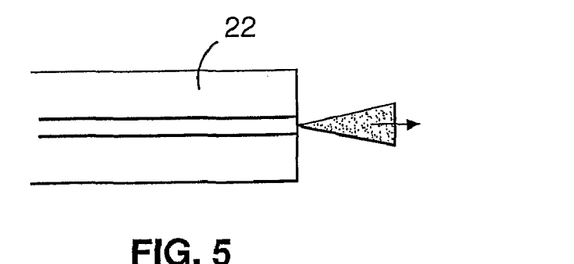
FIG. 5 illustrates projection of light from a single mode fibre with a flat end face.
Figure 6:
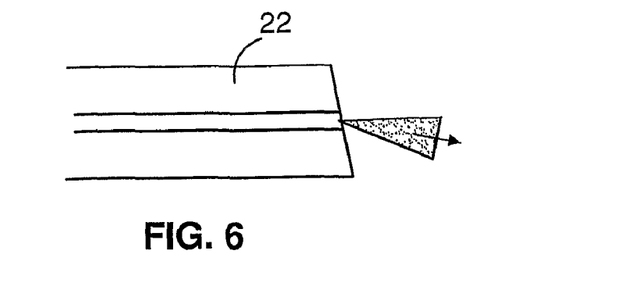
FIG. 6 illustrates projection of light from a single mode fibre with an angled end face.

With reference to FIGS. 5 and 6 which show the light output from a flat end face and an angled end face, guided light that leaves the flat end of an illuminated single mode optical fibre will diverge. The angle of the diverging cone of light will depend on the numerical aperture of the optical fibre which can be related to the difference between its core and cladding refractive indices. If the end face of the fibre is normal to the fibre axis as shown in FIG. 5 the divergence cone will be directed outwardly along the fibre axis. If the end face of the optical fibre is angled it can be shown that the cone of light will now be bent or skewed to one side of the fibre when it exits. This can be illustrated by simply considering how a ray of light would exit the optical fibre end face when the end face is angled. Using Snell's law, it can be shown that the cone of light will actually be bent to one side as shown in FIG. 6. The amount of skew will depend on the angle of the end face. The larger the angle, the larger the skew.

In the reflective modalmetric sensor shown in FIG. 2, a single mode fibre 22 with an angled end face 31 will inject light into the multimode fibre 26 in such a way that more higher-order modes (both core-guided and cladding-guided) will be preferentially excited. For shorter sensor lengths, this will lead to a higher sensitivity of the multimode fibre sensor to external perturbations. It is important to note however that this effect will diminish as the multimode sensing fibre 26 gets longer (>50 m). This is because the distribution of the guided modes in a multimode fibre 26 will eventually reach a steady state or equilibrium where the higher order modes will be attenuated or stripped and only the lower order modes will continue to propagate. In effect, this concentrates the speckle pattern to the central part of the core.

Figure 7:
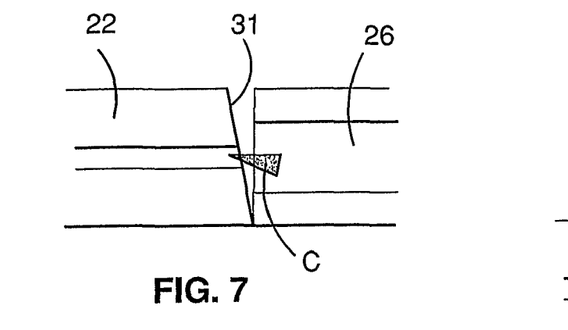
FIG. 7 illustrates projection of light from a single mode fibre with an angled end face into a multimode fibre with a flat end face.

FIG. 7 shows a configuration in which the light cone is launched from an angled face 31 of the fibre 22 to the fibre 26. Again it can be seen that the cone of light C is skewed.

Figure 8:
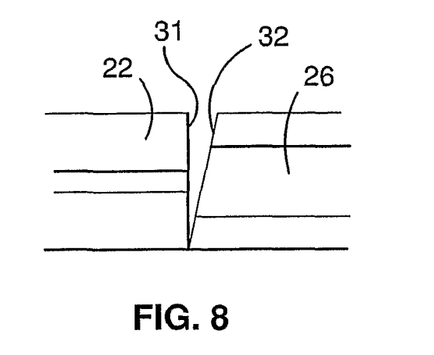
FIG. 8 illustrates a connection between a single mode fibre with a flat end to a multimode fibre with an angled end face.
Figure 9:
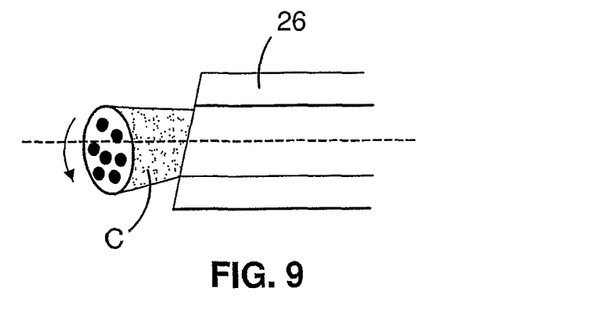
FIG. 9 illustrates projection of a speckled pattern from a multimode fibre with an angled end face.

FIG. 8 shows a configuration where the end face 31 of the single mode fibre 22 is normal to the fibre axis and the end face 32 of the multimode fibre 26 is angled away from the normal to the fibre axis. With this arrangement, the speckle pattern at cone C projects with a vertical offset from the actual centre of the fibre 26 as seen in FIG. 9. This is important in terms of sensitivity as it is known that the movement of speckles which are further away from the centre are more sensitive to external perturbation on the fibre sensor and will undergo a larger movement spatially. This represents a larger change in power at the detector as the speckles redistribute themselves.

Figure 10:
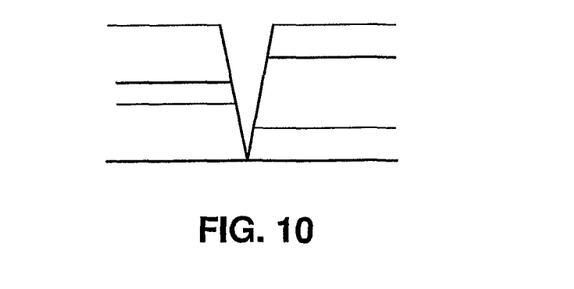
FIG. 10 illustrates a connection between a single mode fibre and multimode fibre both of which have angled end faces and FIG. 10A illustrates projection of a speckled pattern in such a connection.
Figure 10A:
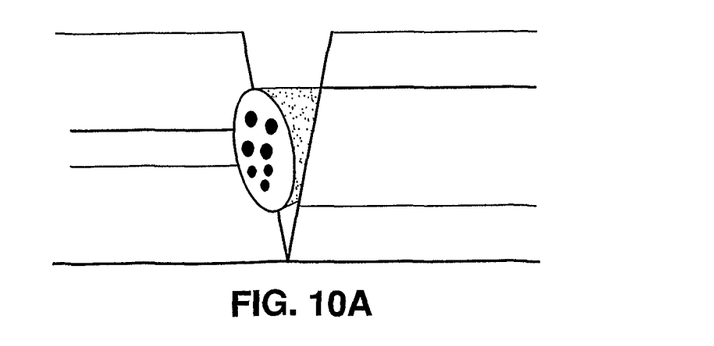

FIGS. 10 and 10A show an embodiment in which both end faces 31 and 32 of the fibres 22 and 26 are angled. As is apparent the angling is not identical so that the end faces are not parallel but subtend an acute angle to one another. FIG. 10A shows the speckle pattern coming from the multimode fibre 26 offset downwards and will be received by the angled end face 31 of the single mode fibre 22 asymmetrically stretched toward the top, producing enhanced sensitivity.

Another important aspect of using the angled connectors or end faces in accordance with the invention is that this eliminates any noise in this system due to parasitic reflections which can be formed by air gaps. Particularly, in systems which use a coherent laser source such as those of the present type, small air gaps in between fibre connectors with parallel end faces can create parasitic Fabry-Perot etalons which will contribute an unwanted interferometric signal. By using angled connectors, such parasitic interference effects can be eliminated.

Figure 11:
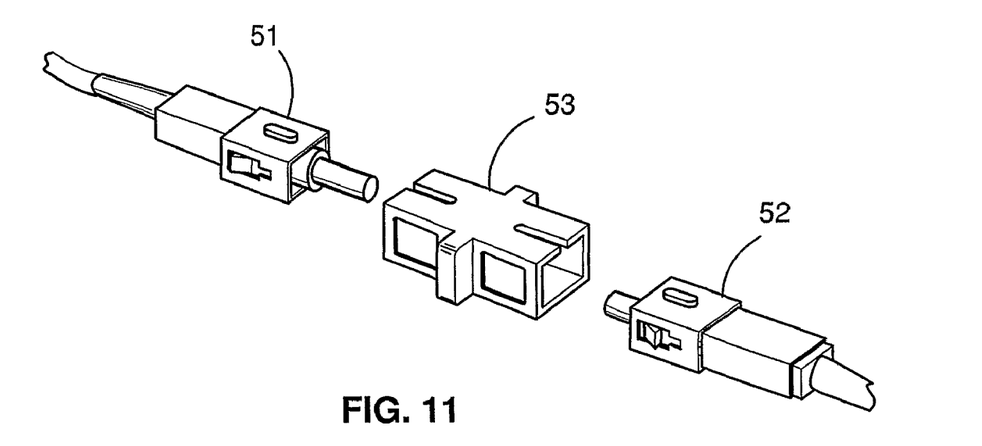
FIG. 11 illustrates one type of fibre connection using standard SC connectors and an SC adaptor.
Figure 12:
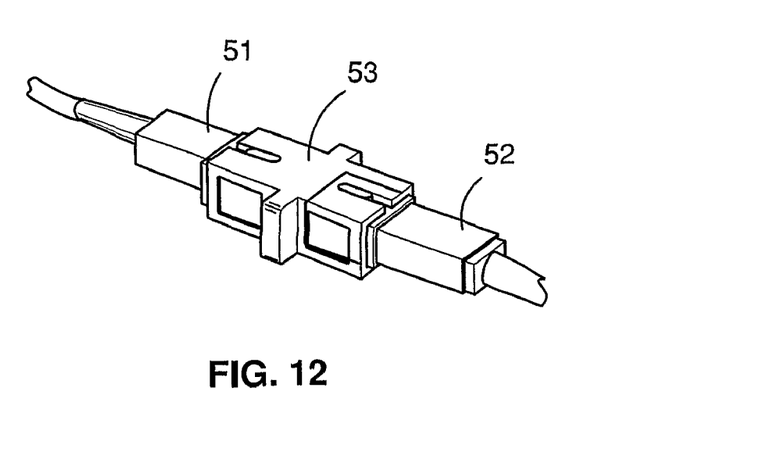
FIG. 12 illustrates the assembled components of FIG. 11.

One practical implementation of the modalmetric sensor connection is to use connectorised fibre ends. One example is to use off-the-shelf connectors such as SC connectors as illustrated in FIGS. 11 and 12 in which FIG. 11 shows the components prior to connection and FIG. 12 shows the completed connection. The single mode fibre 22 is terminated in an angled SC connector 51 having an appropriate angle, for example 8°, whilst the multimode fibre 26 is terminated in a flat SC connector 52. The two fibres can be connected via an SC to SC through adaptor 53.

Figure 13:
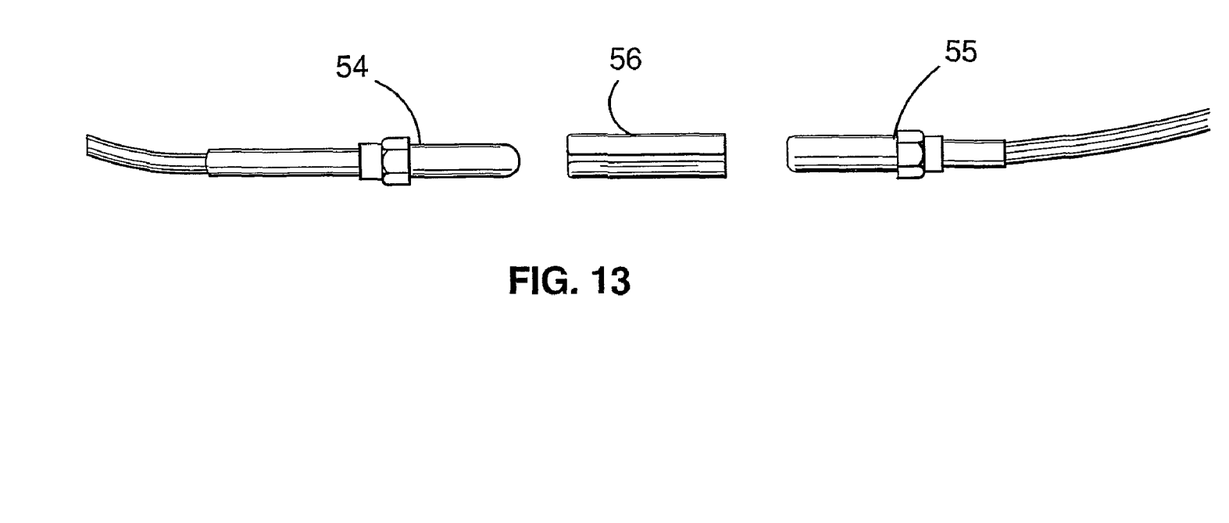
FIG. 13 illustrates components of an alternative type of connector.
Figure 14:
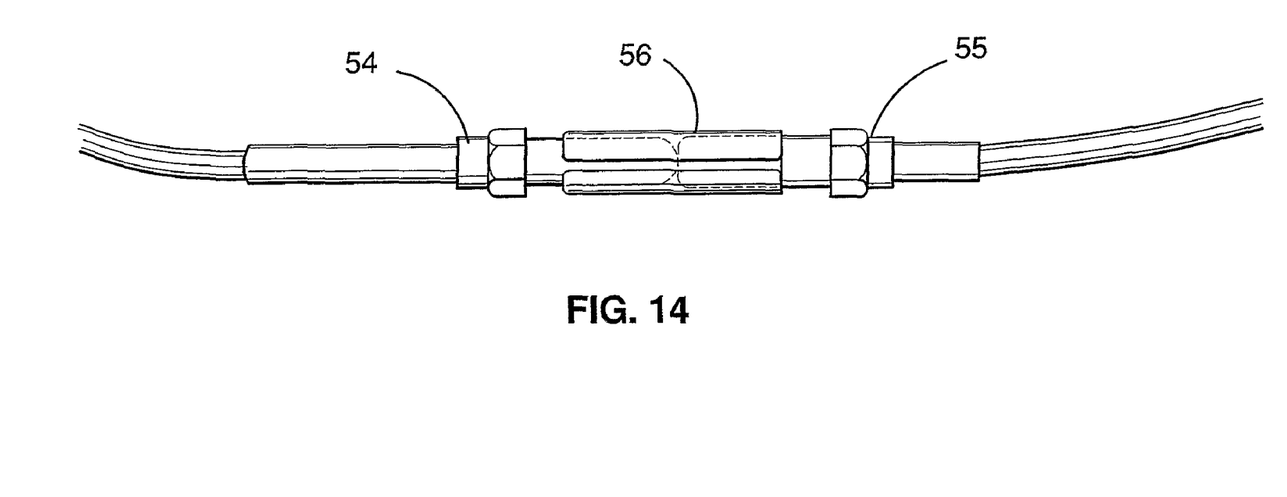
FIGS. 14 and 15 illustrates assembly of the connector of FIG. 13.
Figure 15:
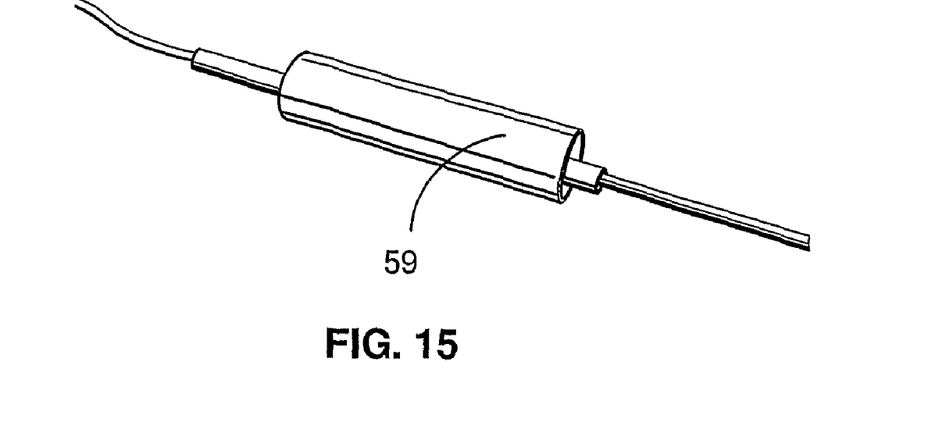

FIGS. 13 to 15 illustrate an alternative implementation which allows for flexibility and different packaging styles of the single mode fibre to multimode fibre end faces. This arrangement uses the bare ferrules 54, 55 or similar from the SC connectors to house the fibre ends whilst a ceramic or plastic slotted sleeve 56 is used to mate the single mode and multimode fibres and the mated fibres are housed in a stainless steel housing 59 for protection. This allows for the junction to be of a smaller form factor which can be mounted inside splice trays, or can be hermetically sealed for mounting in outdoor environments.

Figure 16:
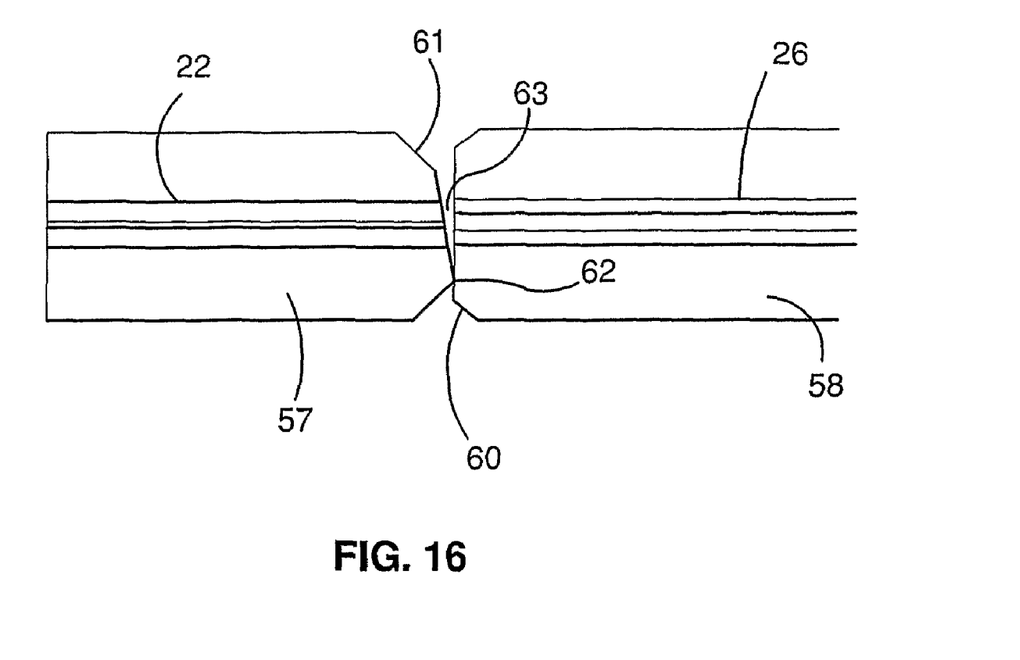
FIG. 16 is a diagrammatic cross-section through the connector of FIGS. 13 to 15.

FIG. 16 illustrates the geometry of the connected fibre ends when connected in the manner illustrated in FIGS. 11 to 13 or FIGS. 14 and 15. In each case the end of single mode fibre 22 is mounted in a ferrule 57 and the end of the multimode fibre 26 is mounted in a ferrule 58. The ferrules may typically be of 2.5 mm diameter and may have end chamfers 60, 61. Typically the single mode fibre 22 may have a fibre core diameter of 9 µm and a cladding diameter of 125 µm. The multimode fibre may typically have a fibre core diameter of 62.5 µm and a cladding diameter of 125 µm. Although the ferrules 57,58 physically touch one another at location 62 a small gap 63 exists between the two fibre ends. For a connection using fibres and ferrules of the above-mentioned dimensions and with a cleave angle of 8°, the centre to centre spacing of the fibres may be approximately 70 µm and at their closest points the optical fibres may be 61.5 µm. To minimise losses and maintain effective spatial filtering, it is preferred to maintain the gap between the fibre ends as small as possible and in any event to ensure that the centre to centre spacing at the fibres is no more than 100 µm.

The selection of an appropriate angle between the end faces of the single mode fibre and the multimode fibre is important as it can affect the sensitivity of the sensing system. In order to test this, experiments were carried out with a single ended (reflective) modalmetric sensor as illustrated in FIG. 2 using different single mode fibre end face angles. A fusion splicer was used to bring the SM and MM fibre ends in close proximity in a controlled manner. To simulate the connectorised implementation described above the centre to centre spacing between the angled SM fibre end and the flat MM fibre end was held at approximately 70 µm. The sensing system used had an SM fibre length of 1 m and an MM fibre sensing length of 425 m with a mirrored end. The laser wavelength was 1310 nm.

To test the sensitivity the signal to noise ratio of the changing part of the detected signal was measured for different SM fibre end face angles when the sensing fibre was perturbed. The angle range test was 0 to 12.6°. A large signal to noise ratio corresponds to a change in the speckle pattern which causes a large change in power at the detector. The signal to noise ratio depends on a combination of the power loss due to the divergence of the light in going from the MM fibre to the angled SM fibre, in combination with how the speckle pattern is projected onto the core of the angled SM fibre end and how it changes when the speckle pattern moves as a result of physical perturbation on the MM fibre.

Figure 17:
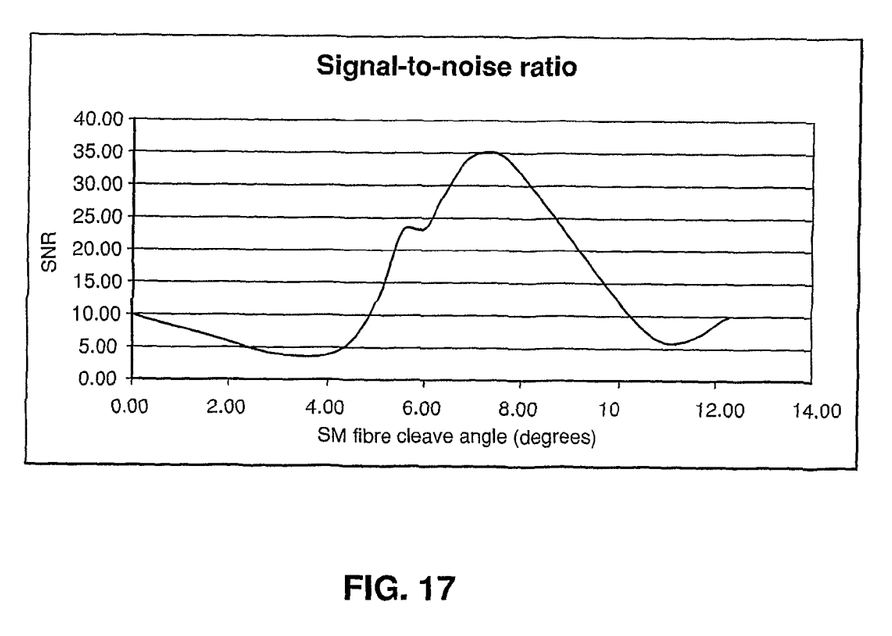
FIG. 17 is a plot of signal-to-noise ratio measurements using a fibre connector connecting a single mode end face with differing end face angles to a multimode fibre with a flat end face.

The results of the above tests are shown in FIG. 17 which plots the measured signal to noise ratio against the SM fibre cleave angle. It can be seen that the optimum angle to use so that the signal to noise ratio is at a maximum is approximately 7.5°. Preferably, the signal to noise ratio should be kept above a factor of 20 which corresponds approximately to an angle range of 5° to 9°. This is an improvement by a factor of at least two over the prior art modalmetric sensors in which the SM and MM fibres are spliced together or connected with their cores in contact.

The illustrated embodiments of the invention have been advanced by way of example only and it is to be understood that many modifications could be made without departing from the scope of the appended claims.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A modalmetric fibre sensor comprising
   a multimode sensor fibre;
   a light source for launching light into the multimode sensor fibre to produce a multimode speckle pattern of light at an end of said multimode sensor fibre which speckle pattern is changed by vibration or perturbation of the multi-mode sensor fibre;
   a single mode fibre of smaller core diameter than the multimode sensor fibre having an end connected to said end of the multimode sensor fibre to receive light from a central part of the multimode speckle pattern; and
   a detector connected to the single mode fibre to detect the received light from the multimode speckle pattern;
   wherein the end faces of said ends of the multimode sensor fibre and the single mode fibre are disposed at an acute angle to one another whereby said end of the single mode fibre receives an asymmetrically stretched central part of the speckle pattern in which the changes in that pattern due to vibration or perturbation of the multi-mode sensor fibre are exaggerated so as to enhance sensitivity of the modalmetric fibre sensor.

2. A modalmetric fibre sensor as claimed in claim 1, wherein said end face of the multimode sensor fibre is normal to the multimode fibre axis and the end face of the single mode fibre is angled away from the normal to the axis of the single mode fibre through said acute angle.

3. A modalmetric fibre as claimed in claim 1 wherein the end face of the single mode fibre is normal to the single mode fibre axis and the end face of the multimode sensor fibre is angled away from the normal to the multimode fibre axis through said acute angle.

4. A modalmetric fibre sensor as claimed in claim 1 wherein both the multimode sensor fibre end face and the single mode fibre end face are angled away from being normal to the respective fibre axes.

5. A modalmetric fibre sensor as claimed in claim 1, wherein the acute angle is in the range 5° to 10°.

6. A modalmetric fibre sensor as claimed in claim 5, wherein said acute angle is in the range 6° to 9°.

7. A modalmetric fibre sensor as claimed in claim 1, wherein said end of the single mode fibre is connected to said end of the multimode fibre such that there is a gap between the centres of the two fibre end faces of less than 100µm.

8. A modalmetric fibre sensor as claimed in claim 7, wherein said ends of the single mode fibre and the multimode sensor fibre are connected by a connector comprising a first holder holding said end of the single mode fibre, a second holder holding said end of the multimode fibre and a connector structure interconnecting the first and second holders.

9. A modalmetric fibre sensor as claimed in claim 8, wherein the first and second holders are held in engagement with one another by the connector structure.

10. A modalmetric fibre sensor as claimed in claim 8, wherein the connector structure provides a protective housing for the connected fibre ends.

11. A modalmetric fibre sensor as claimed in claim 1, wherein the light source is connected to said single mode fibre so as to launch light through the single mode fibre into said end of the multimode sensor fibre and the other end of the multimode sensor fibre is mirrored for reflecting light back through the multimode sensor fibre to produce the speckle pattern at the first said end of the multimode sensor fibre.

12. A modalmetric fibre sensor as claimed in claim 11 wherein the light source and the detector are connected to the single mode fibre by a coupler.

13. A modalmetric fibre sensor as claimed in claim 1, wherein the light source launches light into an end of the multimode sensor fibre remote from the first-said end of that fibre for transmission through the multimode sensor fibre and the single mode fibre to the detector.

14. A modalmetric fibre sensor as claimed in claim 13, wherein the light source is connected to the remote end of the multimode sensor fibre via a second single mode fibre through which to launch light into the remote end of the multimode sensor fibre.

* * * * *

UNITED STATES PATENT AND TRADEMARK OFFICE
CERTIFICATE OF CORRECTION

PATENT NO.      : 8,358,882 B2
APPLICATION NO. : 12/921796
DATED           : January 22, 2013
INVENTOR(S)     : Visagathilagar et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 229 days.

Signed and Sealed this

First Day of September, 2015

Michelle K. Lee
*Director of the United States Patent and Trademark Office*